US011257595B2

(12) United States Patent
Tolliver et al.

(10) Patent No.: US 11,257,595 B2
(45) Date of Patent: Feb. 22, 2022

(54) LOW-POWER PLATFORM WITH MODULAR SENSORS

(71) Applicant: The United States of America as Represented by the Secretary of the Navy, San Diego, CA (US)

(72) Inventors: Laura Catherine Tolliver, Charleston, SC (US); Kevin Paul Votapka, Charleston, SC (US); Scott Christopher Batson, Hanahan, SC (US); Bruce James Billian, Mt. Pleasant, SC (US); Tony Donald Stafford, Summerville, SC (US); Kaitlyn Rebecca Bub, Mt. Pleasant, SC (US); Hunter Joseph Smith, Charleston, SC (US); Lucas Duane Powell, Charleston, SC (US); Wesley Jamel Jones, North Charleston, SC (US); Brandon Scott Lood, Hanahan, SC (US); Joshua James Murphy, Summerville, SC (US); Kevin Joseph Pinzhoffer, Daniel Island, SC (US); Christopher Stephen Williams, Mt. Pleasant, SC (US); Peyton Cavaroc, Charleston, SC (US); Alicia Hilton, North Charleston, SC (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 140 days.

(21) Appl. No.: 16/696,252

(22) Filed: Nov. 26, 2019

(65) Prior Publication Data
US 2020/0168347 A1 May 28, 2020

Related U.S. Application Data

(60) Provisional application No. 62/772,576, filed on Nov. 28, 2018.

(51) Int. Cl.
*G16Y 20/10* (2020.01)
*H04W 84/18* (2009.01)
(Continued)

(52) U.S. Cl.
CPC .............. *G16Y 20/10* (2020.01); *G16Y 40/10* (2020.01); *G16Y 40/35* (2020.01); *H04W 84/18* (2013.01)

(58) Field of Classification Search
CPC ........ G16Y 20/10; G16Y 40/10; G16Y 40/35; H04W 84/18; Y02D 30/70
See application file for complete search history.

(56) References Cited

U.S. PATENT DOCUMENTS

| 2016/0107007 A1* | 4/2016 | Pollard | A62B 35/0075 182/3 |
| 2017/0343326 A1* | 11/2017 | Weiland | F41J 5/056 |

(Continued)

FOREIGN PATENT DOCUMENTS

| KR | 102166986 B1 * | 10/2020 | ........ H04W 52/0216 |

OTHER PUBLICATIONS

Reimer, U.S. Appl. No. 62/725,635, filed Aug. 31, 2018.

*Primary Examiner* — Zhensheng Zhang
(74) *Attorney, Agent, or Firm* — Naval Information Warfare Center, Pacific; Kyle Eppele; James McGee

(57) ABSTRACT

A low-power platform senses an environment around the platform. The platform includes sensor interfaces, a multiplexer, a dual port memory, a processor, and a radio. The similar sensor interfaces are for attaching environmental sensors. The multiplexer combines the environmental data from the attached environmental sensors into a single stream. The dual port memory temporarily stores the stream. The processor intermittently retrieves the stream from the dual port memory. The radio forwards the stream toward a (Continued)

central system. Each interface includes a mechanical interlock for attaching a respective environmental sensor and an electrical interlock for detecting whether the mechanical interlock engages the environmental sensor. Each interface transfers peripheral power and environmental data for the respective environmental sensor. The platform also includes a battery for supplying the peripheral power to the environmental sensors, and for supplying internal power for the interfaces, the multiplexer, the dual port memory, the processor, and the radio.

20 Claims, 2 Drawing Sheets

(51) Int. Cl.
*G16Y 40/10* (2020.01)
*G16Y 40/35* (2020.01)

(56) References Cited

U.S. PATENT DOCUMENTS

| | | | |
|---|---|---|---|
| 2018/0105236 A1* | 4/2018 | Bhageria | G05D 1/0206 |
| 2019/0035242 A1* | 1/2019 | Vazirani | G08B 25/001 |
| 2020/0072766 A1* | 3/2020 | Reimer | A23L 7/197 |

* cited by examiner

LOW-POWER PLATFORM WITH MODULAR SENSORS

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 109723.

BACKGROUND OF THE INVENTION

Across the armed services, it is evident that the modern warfighter has a need for unmanned, low size, weight, and power (SWAP) sensors for gathering intelligence, surveillance, and reconnaissance (ISR).

SUMMARY

A low-power platform senses an environment around the platform. The platform includes sensor interfaces, a multiplexer, a dual port memory, a processor, and a radio. The similar sensor interfaces are for attaching environmental sensors. The multiplexer combines the environmental data received from the attached environmental sensors into a single stream. The dual port memory temporarily stores the stream received from the multiplexer. The processor intermittently retrieves the stream stored in the dual port memory. The radio forwards the stream from the processor toward a central system. Each interface includes a mechanical interlock for attaching a respective environmental sensor and an electrical interlock for detecting whether the mechanical interlock engages the respective environmental sensor. Each interface transfers peripheral power and environmental data between the platform and the respective environmental sensor when the mechanical interlock engages the respective environmental sensor. The platform also includes a battery for supplying the peripheral power to the environmental sensors attached at the interfaces, and for supplying internal power for the interfaces, the multiplexer, the dual port memory, the processor, and the radio.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1A:
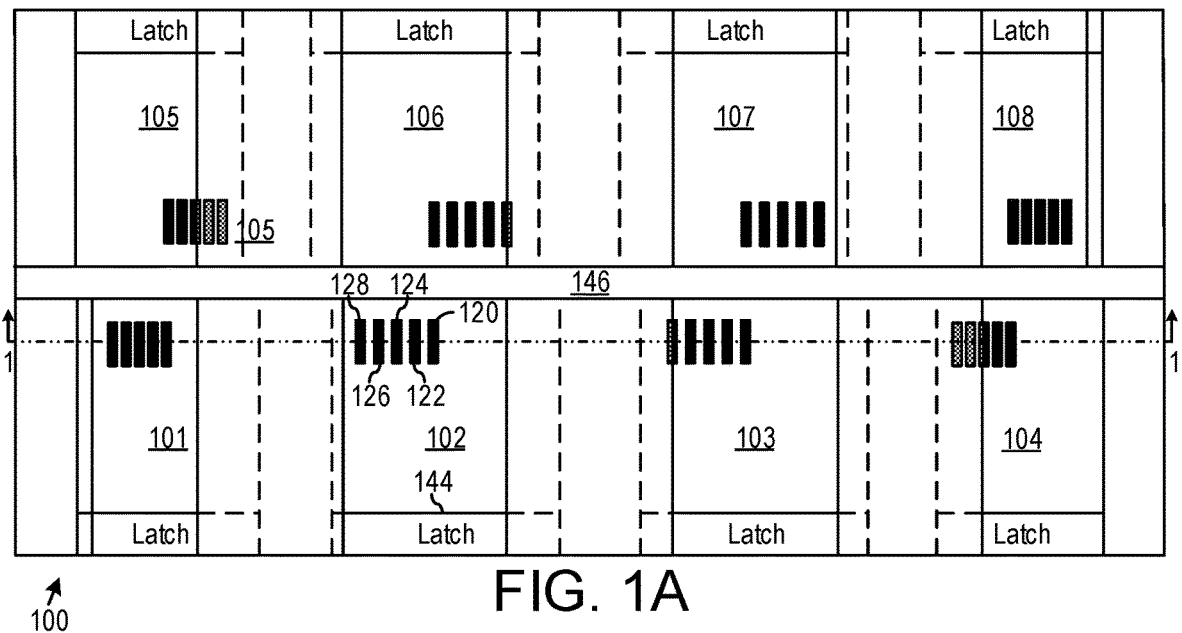
FIG. 1A is a top view of an embodiment of a low-power platform for sensing an environment.
Figure 1B:
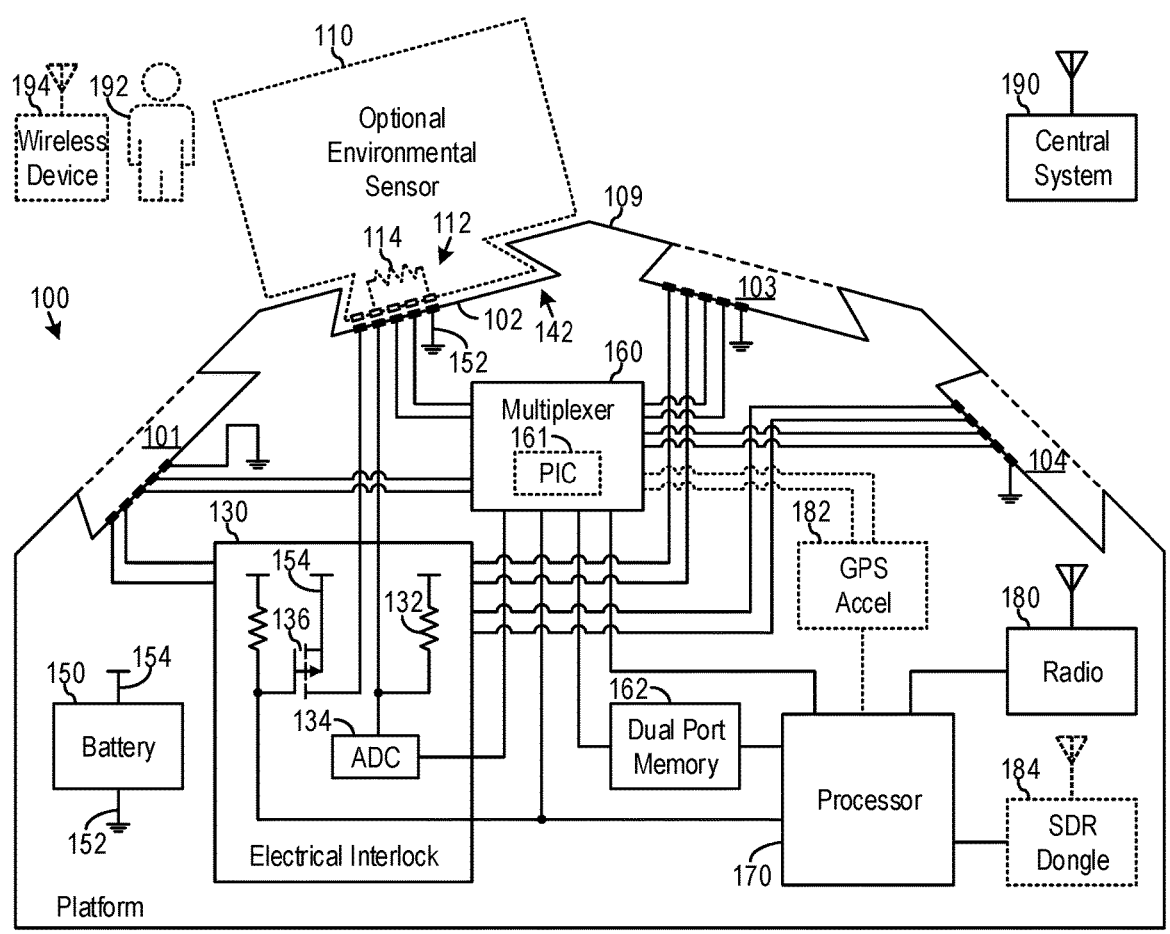
FIG. 1B is a cross-sectional view of an exterior of an embodiment of a low-power platform together with a block diagram of the low-power platform.

FIG. 1A is a top view of an embodiment of a low-power platform 100 for sensing an environment. FIG. 1B is a cross-sectional view of section 1-1 of FIG. 1A, but only for an exterior of the embodiment of the low-power platform 100. FIG. 1B also includes a block diagram of the low-power platform 100.

The low-power platform 100 is battery powered and adapted for dropping at a location to be monitored by an unmanned aerial vehicle (UAV) or for emplacing by hand.

FIG. 1A-B show similar interfaces 101, 102, 103, 104, 105, 106, 107, and 108 of the platform 100. There are more or fewer than eight similar interfaces in another embodiment. Each of these interfaces is for attaching a respective environmental sensor, such as environmental sensor 110 optionally attached at interface 102. The interfaces are arranged on a convex surface 109 of the platform 100, such that when environmental sensors including the environmental sensor 110 are attached at the interfaces 101, 102, 103, 104, 105, 106, 107, and 108, the environmental sensors are oriented to sense in various different directions.

Like the other interfaces, interface 102 includes five signals 120, 122, 124, 126, and 128 in this embodiment for transferring peripheral power from the platform 100 to the environmental sensor 110, and for transferring environmental data collected by environmental sensor 110 from the environmental sensor 110 to the platform 100. Interface 102 also includes an electrical interlock 130 and a mechanical interlock including an asymmetrical dovetail 142 and a latch 144.

When the environmental sensor 110 is attached at interface 102, initially alignment is achieved between the asymmetrical dovetail 142 and a complementary asymmetrical dovetail 112 of the environmental sensor 110. The asymmetry of the asymmetrical dovetails 142 and 112 prevents inserting the environmental sensor 110 into interface 102 at an incorrect orientation. As the environmental sensor 110 slides into interface 102, a leading edge of the environmental sensor 110 engages an inclined surface of the latch 144, and this flexes and depresses the latch 144. Upon the environmental sensor 110 becoming fully inserted into interface 102, a trailing edge of the environmental sensor 110 passes an inward edge of the latch 144, and the latch 144 pops back out, providing tactile and audible feedback that the mechanical interlock engages the environmental sensor 110 between the latch 144 and a crossbeam 146, and with the sensor's complementary dovetail 112 held in the platform's dovetail 142. To remove the environmental sensor 110, the latch 144 is depressed with, for example, a finger, and the environmental sensor 110 is slid back out of the mechanical interlock of interface 102.

When the mechanical interlock engages the environmental sensor 110, the signals 120, 122, 124, 126, and 128 of the platform 100 are connected to corresponding signals of the environmental sensor 110. Signal 120 is a ground signal connected to a negative voltage 152 at battery 150. Signals 122 and 124 are signals for transferring data, such as clock and data signals of an I$^2$C protocol. Signal 126 is a sense signal for sensing a status of interface 102, including whether or not an environmental sensor 110 is attached to interface 102. Signal 128 is a power signal that electrical interlock 130 selectively connects to positive voltage 154 of battery 150.

Battery 150 supplies the peripheral power to the environmental sensors that are attached to the interfaces 101, 102, 103, 104, 105, 106, 107, and 108. Battery 150 also supplies internal power for at least the interfaces, the multiplexer 160, the dual port memory 162, the processor 170, and the radio 180 such as a Digi XBee 900HP Pro radio with a 6 inch RPSMA antenna. In one embodiment, battery 150 is a 20,000 mAh 5V lithium polymer battery that removed from the platform 100.

The electrical interlock 130 detects whether the mechanical interlock of interface 102 engages any environmental sensor. When no environmental sensor is engaged at interface 102, resistor 132 biases the sense signal 126 toward the positive voltage 154, and the analog-to-digital converter (ADC) 134 generates a corresponding digital value. When the environmental sensor 110 is engaged at interface 102, resistor 132 and a resistor 114 of environmental sensor 110 form a voltage divider between the positive voltage 154 and the negative voltage 152 of ground signal 120, and this biases the sense signal 126 to an intermediate voltage between the positive voltage 154 and the negative voltage 152. For example, if resistors 132 and 114 have the same resistance value, the intermediate voltage is halfway between the positive voltage 154 and the negative voltage 152. The ADC 134 generates a corresponding digital value.

Figure 2:
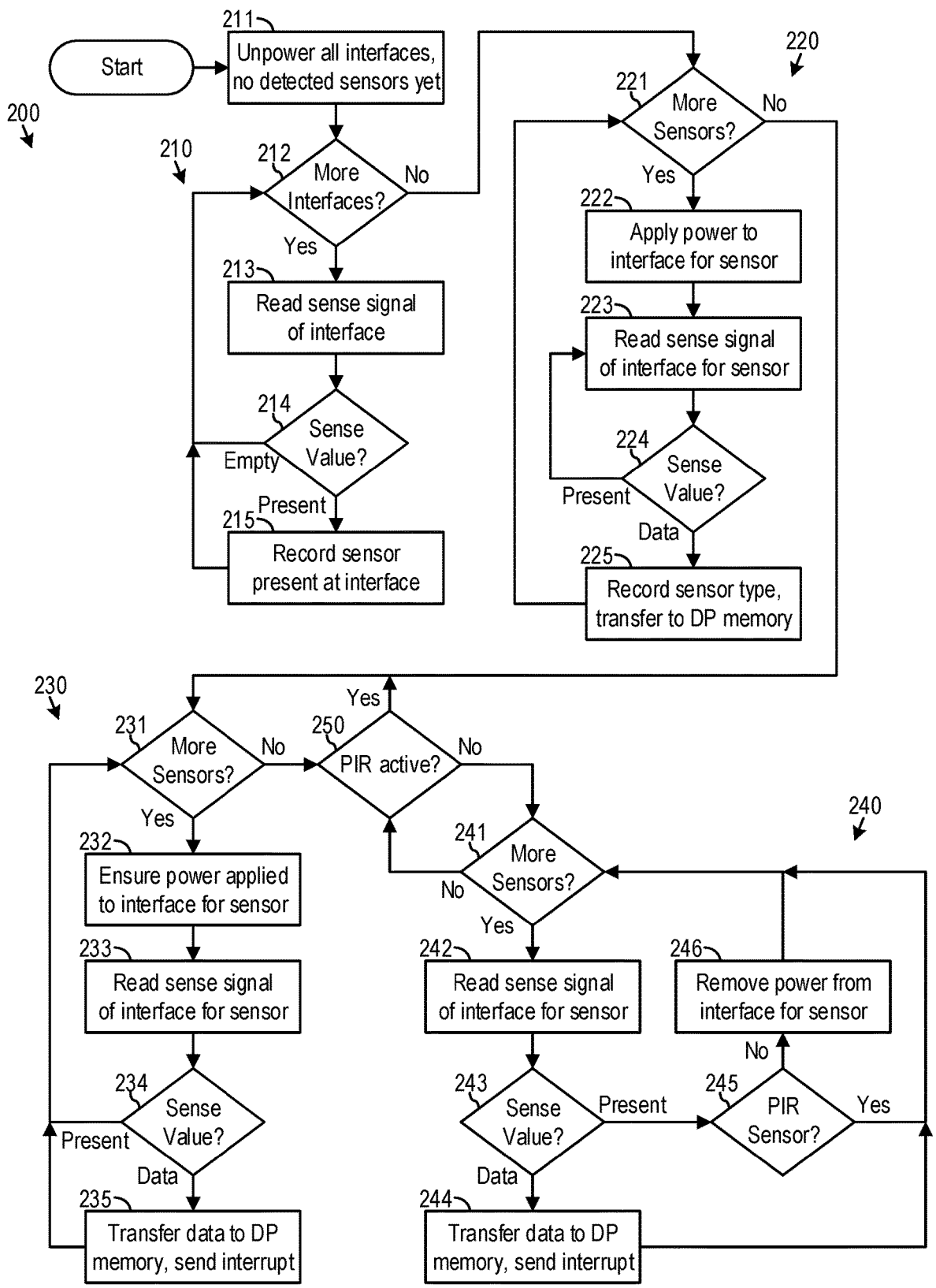
FIG. 2 is a flow diagram of an embodiment of a process for multiplexing environmental data from environmental sensors into a single data stream.

Thus, the multiplexer 160 determines from the digital value from ADC 134 whether an environmental sensor is engaged at interface 102. When no environmental sensor is engaged at interface 102, the digital value corresponds to the positive voltage 154. When the environmental sensor 110 is engaged at interface 102, the digital value corresponds to a lower voltage. The detailed operation of the multiplexer 160 for one embodiment is shown in FIG. 2 discussed below.

Although the circuit details are shown in FIG. 1B for only one electrical interlock 130 for interface 102, there are similar electrical interlocks for interfaces 101, 103, and 104 with connections as shown in FIG. 1B, and similar electrical interlocks for interfaces 105, 106, 107, and 108 with connections not shown in FIG. 1A-B. However, in one embodiment, ADC 134 is an Analog Devices AD7327 having eight voltage input pins and an internal analog multiplexer, such that a single ADC 134 is shared between the electrical interlocks for interfaces 101, 102, 103, 104, 105, 106, 107, and 108. The other components of electrical interlock 130 for interface 102 are duplicated in the other electrical interlocks for the other interfaces 101, 103, 104, 105, 106, 107, and 108.

When multiplexer 160 determines from the digital value from ADC 134 that the environmental sensor 110 is engaged at interface 102, multiplexer 160 enables transistor switch 136 to connect the positive voltage 154 from battery 150 to power signal 128 at interface 102. Waiting for electrical interlock 130 to detect that the mechanical interlock of interface 102 engages environmental sensor 110 helps insure that the positive voltage 154 from battery 150 does not become shorted at any unused ones of interfaces 101, 102, 103, 104, 105, 106, 107, and 108. Multiplexer 160 disables transistor switch 136 to disconnect battery power from the power signal 128 when the sense signal 126 indicates environmental sensor 110 is disengaged or when certain types of the environmental sensor 110 become idle as shown in FIG. 2 discussed below for one embodiment. Thus, power dissipation is diminished by removing power from certain idle environmental sensors.

Besides indicating whether or not the environmental sensor is engaged at interface 102, the sense signal 126 also indicates when environmental data is ready for transfer from the environmental sensor 110 engaged at interface 102. A typical environmental sensor 110 provides feedback on the sense signal 126 with an open-collector or an open-drain transistor that connects sense signal 126 to ground signal 120. Because power is required to connect sense signal 126 to ground signal 120 with such a transistor, this feedback is possible only when power from battery 150 is applied to power signal 128.

In one implementation, environmental sensor 110 connects sense signal 126 to ground signal 120 to provide the feedback that the environmental sensor 110 has environmental data ready for transfer. When the environmental sensor 110 engaged at interface 102 is powered and has collected environmental data that is ready for transfer, ADC 134 generates a digital value corresponding to the negative voltage 152 at sense signal 126, and from this digital value multiplexer 160 determines that environmental sensor 110 has environmental data ready for transfer. Multiplexer 160 then transfers this environmental data from environmental sensor 110 to dual port memory 162.

In another implementation, the environmental sensor 110 connects sense signal 126 to ground signal 120 to provide the feedback acknowledging the application of power to the environmental sensor 110. Subsequently, when the environmental sensor 110 has environmental data ready for transfer, the environmental sensor 110 releases grounding the sense signal 126 with the open-collector or an open-drain transistor. In this implementation, after the environmental sensor 110 engaged at interface 102 has acknowledged being powered, when the environmental sensor 110 has collected environmental data that is ready for transfer, ADC 134 generates a digital value corresponding to an intermediate voltage between the positive voltage 154 and the negative voltage 152 at sense signal 126, and from this digital value multiplexer 160 determines that environmental sensor 110 has environmental data ready for transfer. After multiplexer 160 transfers the environmental data to dual port memory 162, the environmental sensor 110 releases grounding the sense signal 126 until the environmental sensor 110 again has environmental data ready for transfer.

Multiplexer 160 combines the environmental data received from the environmental sensors attached to the interfaces 101, 102, 103, 104, 105, 106, 107, and 108 into a single stream temporarily stored in dual port memory 162. Note the connection from interfaces 105, 106, 107, and 108 to multiplexer 160 are not shown in FIG. 1B, but these connections are similar to those shown for interfaces 101, 102, 103, and 104.

The purpose of dual port memory 162 is to buffer the bandwidth mismatch between the environmental sensors and the processor 170. Without dual port memory 162, the processor 170 would continually poll the environmental sensors for environmental data, and processor 170 would incur significant power dissipation during this polling. Instead, multiplexer 160 fills dual port memory 162 at the slow data rate supported by the data transfer signals 122 and 124 (such as clock and data signals of an I$^2$C protocol) that connect the environmental sensors to the multiplexer 160. When the transfer of the environmental data from the environmental sensor 110 to the dual port memory 162 completes, multiplexer 160 generates an interrupt to the processor 170. This interrupt may include restarting a halted processor 170. Processor 170 then retrieves the environmental data from the dual port memory 162 at the high bandwidth native to processor 170. Because processor 170 intermittently retrieves the stream of environmental data from the dual port memory 162 at full speed, processor 170 does not incur any power dissipation awaiting slow environmental sensors. This helps make platform 100 a low-power platform 100. In one embodiment, the dual port memory 162 is a ON Semiconductor CAT24C208, which is an 8 kilobit dual port EEPROM used for temporary storage. It will be appreciated that the dual port memory 162 is any storage system having input and output ports configurable to have different data rates and/or bandwidths, and such a storage system can include a processor.

In response to the interrupt from the multiplexer 160 indicating that the dual port memory 162 stores the environmental data from environmental sensor 110 or other environmental sensors attached at the interfaces, processor 170 reformats the stream of environmental data retrieved from the dual port memory 162, and then, via the radio 180, processor 170 forwards the stream toward a central system 190. This forwarding is either a direct communication from the radio 180 to the central system 190, or forwarding via one or more additional intermediate platforms similar to platform 100 that together form part of a communication mesh with the central system 190. Similarly, platform 100 participates in the communication mesh upon receiving another stream from an additional platform via the radio 180 and then forwarding this stream directly or indirectly toward the central system 190 via the radio 180.

In one embodiment, the type of each environmental sensor attached to interfaces 101, 102, 103, 104, 105, 106, 107, and 108, such as environmental sensor 110 optionally attached at interface 102, is one of: a passive infrared (PIR) sensor such as a Panasonic EKMB1203111 for detecting a physical presence 192, an active microwave sensor such as a Chenbo RCWL-0516 for detecting a physical presence 192, an acoustic receiver such as a microphone, a magnetometer for sensing an orientation of the platform 100 relative to the Earth's magnetic field or for sensing other magnetic fields, a hyperspectral imager, a detector of wireless ethernet communications from a wireless device 194, a detector of cellular communications from a wireless device 194, a radio receiver, a receiver for a global positioning system (GPS) such as a Sparkfun GP-20U7, and an accelerometer such as a STMicroelectronics LSM303AGRTR for detecting movement of the platform. Although typically the attached environmental sensors are all of differing types, multiple instances of a single type can be attached, such as multiple PIR sensors attached at interfaces oriented in different directions. It will be appreciated that the environmental sensor 110 might include a combination of these types, such as the environmental sensor 110 including both a GPS receiver and an accelerometer.

In another embodiment, platform 100 includes an optional module 182, which includes a GPS receiver and an accelerometer. Embedding optional module 182 ensures that accurate time is available from the GPS receiver for initialing a real-time clock used for timestamping the environmental data from all of the attached environmental sensors. In addition, movement of the platform 100 might indicate that the platform 100 has been discovered and compromised, such that embedding optional module 182 ensures that detecting platform movement is included in this embodiment.

A local interface couples the optional GPS/accelerometer module 182 to the multiplexer 160. When the GPS receiver has updated position or time data or the accelerometer has movement data ready for transfer, the multiplexer 160 transfers this local data from module 182 to the dual port memory 162, combining this local data with the environmental data from any attached environmental sensors to form a single stream temporarily stored in dual port memory 162. The multiplexer 160 is inactive in a standby mode until any one of the interfaces 101, 102, 103, 104, 105, 106, 107, and 108 indicates its attached environmental sensor has the environmental data ready for transfer, or until the local interface indicates GPS/accelerometer module 182 has the local data ready for transfer. The multiplexer 160 generates an interrupt to the processor 170 after transferring the environmental data or the local data to the dual port memory 162. Then the multiplexer 160 returns to the inactive standby mode.

A detector of wireless communications is an example type of environmental sensor 110 attached at interface 102 or another of the interfaces. This detector detects one or more wireless networks, such as ethernet or cellular device 194 carried by physical presence 192. This detector detects a respective name of each wireless network, such as a wireless network name or a cellular tower identifier. This detector further detects a received signal strength and a network address, such as a MAC or IP address, for each of one or more devices active on each wireless network. This detected environmental data is transferred from environmental sensor 110 to the platform 100 for the forwarding toward the central system 190.

In response to receiving the environmental data describing RF or wireless cyber situational awareness, the processor 170 is adapted to implement one or more of the following functions: gathering of enhanced RF or wireless cyber situational awareness, remote network vulnerability penetration testing, and deployment of open source cyber effects. These functions may be conducted using the optional SDR dongle 184 or one or more wireless network adapters, or a combination of both.

SDR dongle 184 is a software defined radio optionally included in platform 100. Because the SDR dongle 184 requires a significant amount of computing power, SDR dongle 184 is directly connectable to processor 170 that provides this computing power. In one embodiment, SDR dongle 184 is a Realtek RTL2832U interface integrated circuit and an Elonics E4000 tuner plus a ±0.5 ppm TCXO oscillator.

In one embodiment, processor 170 is a Broadcom BCM2837B0 with a 64-bit ARM core of a Raspberry Pi 3 Model B+. The Broadcom BCM2837B0 has a halt state providing low power dissipation, and the Broadcom BCM2837B0 is awakened from the halt state upon receiving a wakeup signal at certain input pins or upon an internal interrupt from an interval timer, which continues running in the halt state. The Broadcom BCM2837B0 also supports variable clocking speed to tradeoff power dissipation and computing power. The operating system for the Raspberry Pi 3 Model B+ is Ubuntu Mate 16.04, and upon the interrupt from the interval timer, the operating system starts a Cron process configurable to start other processes.

In an example configuration of the low-power platform 100, a quiescent state has the processor 170 halted and the multiplexer 160 in an inactive standby mode. Power is applied to the environmental sensor 110 engaged at interface 102 because the environmental sensor 110 is a PIR sensor in this example configuration, but power is not applied to any of the remaining interfaces 101, 103, 104, 105, 106, 107, and 108 because either no environmental sensor is thereon engaged or because the environmental sensor engaged thereon is not a PIR sensor. The receiver of radio 180 is powered or in a cyclic sleep-wake state in this example configuration, but the transmitter of radio 180 is not powered. The accelerometer of module 182 included in this example configuration is powered, but the GPS receiver of module 182 is not powered.

The low-power platform 100 remains in the quiescent state with the processor halted in this example configuration until one of the following four events occurs: (1) the powered PIR sensor 110 detects physical presence 192, (2) the accelerometer of module 182 detects movement of platform 100, (3) the radio 180 receives a wakeup call directly or indirectly from the central system 190 or the radio 180 receives a stream from another platform addressed for forwarding from platform 100 toward the central system 190, or (4) a periodic self-awakening from an interval timer of processor 170 that continues running in the halted state.

When PIR sensor 110 detects physical presence 192 or the accelerometer of module 182 detects movement, the multiplexer 160 applies power to all of the attached environmental sensors and, after the multiplexer 160 completes transferring the resulting environmental data into dual port memory 162, the multiplexer 160 generates an interrupt that brings processor 170 out of the halted state to retrieve the stream from the dual port memory 162 and forward the stream toward the central system 190 via the transmitter of radio 180.

When radio 180 receives a wakeup call or a stream needing forwarding, radio 180 brings processor 170 out of the halted state. For the wakeup call or for the periodic self-awakenings, processor 170 applies power to all of the attached environmental sensors to collect environmental data. Upon awakenings other than for forwarding a stream received from another platform, processor 170 applies power to the GPS receiver of module 182 and the SDR dongle 184 included in this example configuration. Processor 170 applies power to the transmitter of radio 180 as needed to transmit a stream directly or indirectly to the central system 190.

FIG. 2 is a flow diagram of an embodiment of a process 200 for multiplexing environmental data from environmental sensors into a single data stream as implemented in the multiplexer 160 of FIG. 1B.

Process 200 had four major loops. Loop 210 detects the environmental sensors attached at interfaces 101, 102, 103, 104, 105, 106, 107, and 108. Loop 220 detects the type of each of the attached environmental sensors. Loop 230 continuously collects environmental data from all of the attached environmental sensors so long as a PIR sensor continues to detect a physical presence. When no PIR sensor detects a physical presence, loop 240 powers down each of the attached environmental sensors as soon as the attached environmental sensor no longer has environmental data ready for transfer, but each PIR sensor remains powered to enable a transition back to loop 230 upon the PIR sensor detecting a physical presence. Multiplexer 160 enters an inactive standby mode in loop 240 after all attached environmental sensors that are not a PIR sensor become powered down.

Upon initial power-up the platform 100 and its multiplexer 160, all the interfaces 101, 102, 103, 104, 105, 106, 107, and 108 are powered down and the attached environmental sensors are unknown at step 211. Decision 121 checks whether all the interfaces have been processed in loop 210. If all interfaces have been considered, process 200 proceeds to loop 220. Otherwise, process 200 proceeds to step 213. At step 213, the sense signal for the current interface is read. Decision 214 checks the voltage of the sense signal. When the sense voltage indicates no environmental sensor is attached at the current interface, process 200 returns to decision 212 to process the next interface, if any. When the sense voltage indicates an environmental sensor is attached at the current interface, process 200 proceeds to step 215. At step 215, recorded is the presence of an attached environmental sensor at the current interface. Thus, loop 210 produces a list stored in multiplexer 160 of those of the interfaces having attached environmental sensors.

In loop 220, decision 221 checks whether there are more environmental sensors to be processed in loop 220. If not, process 200 proceeds to loop 230. Otherwise process 200 proceeds to step 222. At step 222, power is applied to the identified interface for the current sensor. At step 223, the sense signal of the interface for the current sensor is read. Decision 224 checks the voltage of the sense signal. When the sense voltage indicates the current sensor has data ready for transfer, process 200 proceeds to step 225; otherwise process 200 returns to step 223. In this embodiment, after power up each environmental sensor is designed to quickly prepare environmental data indicating the type of the environmental sensor, such that process 200 quickly proceeds for the current sensor to step 225, where multiplexer 160 records the type of the current sensor and transfers this environmental data to the dual port memory 162, and then sends an interrupt to processor 170. Not shown in FIG. 2 is the error condition of the sense voltage corresponding to an empty interface or a timeout awaiting the environmental data, for which loop 220 powers down the interface and removes the presence of an attached environmental sensor at the interface. Thus, loop 220 powers up all of the attached environmental sensors and produces a list stored in multiplexer 160 of the type of each environmental sensor attached at the interfaces.

In loop 230, decision 231 checks whether there are more environmental sensors to be processed in loop 230. If not, process 200 proceeds to decision 250. Otherwise process 200 proceeds to step 232. Step 232 ensures power is applied to the identified interface for the current sensor. This reapplies power for each environmental sensor powered down in loop 240 at step 246. At step 233, the sense signal for the interface for the current sensor is read. Decision 234 checks the voltage of the sense signal. When the sense voltage indicates the current sensor has environmental data ready for transfer, process 200 proceeds to step 235; otherwise process 200 returns to decision 231. At step 235, multiplexer 160 transfers the environmental data to the dual port memory 162. Then multiplexer 160 sends an interrupt to processor 170. Thus, loop 230 ensures all of the attached environmental sensors are powered and loop 230 continuously collects environmental data from all of the attached environmental sensors.

Decision 250 controls whether loop 230 transitions to loop 240, and vice versa. If a PIR sensor is found active at decision 250, process 200 proceeds to loop 230 that continuously collects environmental data from all of the attached environmental sensors. Otherwise, process 200 proceeds to loop 240 at decision 241.

In loop 240, decision 241 checks whether there are more environmental sensors to be processed in loop 240. If not, process 200 returns to decision 250. Otherwise process 200 proceeds to step 242. At step 242, the sense signal for the interface for the current sensor is read. Decision 243 checks the voltage of the sense signal. When the sense voltage indicates the current sensor has environmental data ready for transfer, process 200 proceeds to step 244; otherwise process 200 proceeds to decision 245. At step 244, multiplexer 160 transfers the environmental data to the dual port memory 162. Then multiplexer 160 sends an interrupt to processor 170. Decision 245 checks the type of the current sensor when no there was no environmental data. If the type of the current sensor is a PIR sensor, process 200 skips step 246 at which power is removed from the interface for the idle environmental sensor to put asleep the interface for the idle environmental sensor. Process 200 then returns to decision 241. Thus, loop 240 continues collecting environmental data from each attached environmental sensors so long as the attached environmental sensor continues generating environmental data, for example, because the attached environmental sensor continues sensing a physical presence 192 or a wireless device 194 carried by physical presence 192. However, once the attached environmental sensor stops generating environmental data, the attached environmental sensor is powered down unless it is a PIR sensor.

In one embodiment, process 200 is implemented in the low-power programmable interface controller (PIC) 161 of multiplexer 160 of FIG. 1B, such as a Microchip PIC18(L)F2XK42.

In another embodiment, process 200 is implemented in a complex programmable logic device (CPLD), such as a Xilinx CoolRunner-II CPLD, of multiplexer 160 of FIG. 1B. This embodiment has very low power dissipation because all switching activity can stop in multiplexer 160 during the inactive standby mode of an example implementation. In this example implementation, resistor 114 of optional environmental sensor 110 has a different value for a PIR sensor than for other sensors, and data transfer signals 122 and 124 are redefined for the PIR sensor to be binary signals indicating detection of physical presence 192 at respective directions or distances. In the inactive standby mode, multiplexer 160 powers down all the inactive attached environmental sensors except for the attached environmental sensor 110 that is a PIR sensor, and the multiplexer 160 awaits a transition on the data transfer signals 122 and 124 indicating detection of physical presence 192. Upon the transition on data transfer signal 122 or 124, multiplexer 160 writes corresponding environmental data into dual port memory 162, and then interrupts processor 170 to bring processor 170 out of the halted state.

From the above description of the Low-Power Platform with Modular Sensors, it is manifest that various techniques may be used for implementing the concepts of low-power platform 100 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that low-power platform 100 is not limited to the particular embodiments described herein, but is capable of many embodiments without departing from the scope of the claims.

We claim:

1. A low-power platform for sensing an environment comprising:
a plurality of interfaces for attaching environmental sensors, each of the interfaces including a mechanical interlock for attaching a respective one of the environmental sensors and an electrical interlock for detecting whether the mechanical interlock engages the respective environmental sensor, each of the interfaces for transferring peripheral power and environmental data between the platform and the respective environmental sensor when the mechanical interlock engages the respective environmental sensor;
a multiplexer for combining the environmental data received from the environmental sensors that are attached to the interfaces into a single stream;
a dual port memory for temporarily storing the stream received from the multiplexer;
a processor for intermittently retrieving the stream stored in the dual port memory;
a radio for forwarding of the stream from the processor toward a central system; and
a battery for supplying the peripheral power to the environmental sensors that are attached to the interfaces, and for supplying internal power for the interfaces, the multiplexer, the dual port memory, the processor, and the radio.

2. The platform of claim 1, further comprising a passive infrared (PIR) sensor that is the respective environmental sensor attached at one of the interfaces.

3. The platform of claim 1, further comprising a detector of wireless communications that is the respective environmental sensor attached at one of the interfaces, the detector configured to detect one or more wireless networks, including detecting a respective name of each wireless network, and further including detecting a network address and a received signal strength for each of one or more devices active on each wireless network, wherein the environmental data for the detector includes, for each of the one or more wireless networks, the respective name of the wireless network and the network address and the received signal strength of each of the one or more devices active on the wireless network, and wherein the environmental data for the detector is transferred from the detector to the platform for the forwarding toward the central system.

4. The platform of claim 3, wherein, for each the one or more wireless networks, the processor is adapted to support enhanced RF or wireless cyber situational awareness, remote network vulnerability penetration testing, or deployment of open source cyber effects.

5. The platform of claim 1, further comprising the environmental sensors attached to the interfaces, wherein each of the environmental sensors is one of:
a passive infrared (PIR) sensor for detecting a physical presence;
an active microwave sensor for detecting a physical presence;
an acoustic receiver;
a magnetometer;
a hyperspectral imager;
a detector of wireless ethernet communications;
a detector of cellular communications;
a radio receiver;
a receiver for a global positioning system (GPS); and
an accelerometer for detecting movement of the platform.

6. The platform of claim 1, wherein the interfaces are arranged on a convex surface of the platform, such that when the environmental sensors are attached at the interfaces, the environmental sensors are oriented to sense in a plurality of different directions.

7. The platform of claim 1, wherein each interface of the interfaces is asleep except:
during ascertaining an identity of the respective environmental sensor for the interface in response to the electrical interlock detecting the mechanical interlock has engaged the respective environmental sensor;
during continuous monitoring when the identity ascertained for the respective environmental sensor for the interface is a passive infrared (PIR) sensor because the PIR sensor continuously monitors for a physical presence;

during a monitoring interval for the respective environmental sensor for the interface having the identity ascertained to be other than the PIR sensor while the PIR sensor at another of the interfaces detects the physical presence;

during continuing monitoring for the respective environmental sensor for the interface having the identity ascertained to be other than the PIR sensor while the respective environmental sensor also detects and continues to detect the physical presence; and during periodic brief awakenings to poll for the environmental data from the respective environmental sensor having the identity ascertained to be other than the PIR sensor.

8. The platform of claim 1, wherein the electrical interlock for each interface of the interfaces includes:

two supply signals including a positive signal and a negative signal for supplying the peripheral power from two terminals of the battery, the two terminals outputting a first voltage and a second voltage that are a supply voltage and a ground voltage;

a sense signal for being biased to one of the first voltage, the second voltage, and a third voltage between the first and second voltages, wherein the sense signal biased at the first voltage indicates the mechanical interlock is not engaging the respective environmental sensor, and the sense signal biased at the second and third voltages indicates that the mechanical interlock is engaging the respective environmental sensor; and a first resistor for biasing the sense signal toward the first voltage at the interface, wherein while the mechanical interlock engages the respective environmental sensor, the first resistor and a second resistor of the respective environmental sensor form a voltage divider between the first and second voltages that biases the sense signal to the third voltage.

9. The platform of claim 8, wherein the electrical interlock further includes:

an analog-to-digital converter for converting a voltage of the sense signal into a range of digital values that distinguish the first, second, and third voltages.

10. The platform of claim 8, wherein:

the positive signal is for supplying the first voltage that is the supply voltage, and the negative signal supplies the second voltage that is the ground voltage; and the sense signal biased at the second voltage indicates both that the mechanical interlock is engaging the respective environmental sensor and that the environmental data from the respective environmental sensor is ready for transfer.

11. The platform of claim 10, wherein the electrical interlock further includes a transistor switch for controlling whether the supply voltage from the battery is connected to the positive signal, wherein:

the transistor switch connects the supply voltage to the positive signal while the sense signal indicates the mechanical interlock is engaging the respective environmental sensor and the interface is not asleep, and otherwise the transistor switch disconnects the supply voltage from the positive signal.

12. The platform of claim 10, wherein the multiplexer is configured, in response to the sense signal of one of the interfaces indicating that the environmental data from the respective environmental sensor is ready for transfer, to transfer the environmental data from the respective environmental sensor to the dual port memory for temporary storage in the stream, and the multiplexer is configured to generate an interrupt to the processor upon completing the transfer of environmental data from the respective environmental sensor to the dual port memory.

13. The platform of claim 1, wherein the multiplexer is inactive in a standby mode until any one of the interfaces indicates that the environmental data from the respective environmental sensor is ready for transfer or until a local interface indicates that local data is ready for transfer, and the multiplexer returns to the inactive standby mode after transferring the environmental data or the local data to the dual port memory for temporary storage in the stream.

14. The platform of claim 13, wherein the local data is position data from a receiver for a global positioning system (GPS) and/or movement data from an accelerometer, the receiver and/or the accelerometer coupled to the multiplexer via the local interface, and wherein the multiplexer is configured to generate an interrupt to the processor after transferring the environmental data or the local data to the dual port memory.

15. The platform of claim 1, wherein the processor is adapted to be halted except:

during retrieving the stream from the dual port memory and forwarding the stream toward the central system via the radio in response to an interrupt from the multiplexer indicating that the dual port memory stores the environmental data from at least one of the environmental sensors attached to the interfaces;

during periodic self-awakening, for which awakenings the processor is adapted to awaken each sleeping one the environmental sensors attached to the interfaces;

during awakening by the radio upon receiving a wakeup call from the central system;

during implementing a software defined radio using a dongle; and during forwarding another stream received from an additional platform via the radio and forwarded toward the central system via the radio, the platform and the additional platform forming part of a communication mesh among a plurality of platforms and the central system.

16. The platform of claim 15, further comprising the dongle of the software defined radio.

17. The platform of claim 1, wherein the platform is adapted to be dropped at a location by an unmanned aerial vehicle (UAV) and also adapted to be placed at a location by hand.

18. A low-power platform for sensing an environment comprising:

a plurality of interfaces for attaching environmental sensors, each of the interfaces including a mechanical interlock for attaching a respective one of the environmental sensors and an electrical interlock for detecting whether the mechanical interlock engages the respective environmental sensor, each of the interfaces for transferring peripheral power and environmental data between the platform and the respective environmental sensor when the mechanical interlock engages the respective environmental sensor;

a multiplexer for combining the environmental data received from the environmental sensors that are attached to the interfaces into a single stream;

a dual port memory for temporarily storing the stream received from the multiplexer;

a processor for intermittently retrieving the stream stored in the dual port memory;

a radio for forwarding of the stream from the processor toward a central system; and a battery for supplying the peripheral power to the environmental sensors that are attached to the interfaces, and for supplying internal power for the interfaces, the multiplexer, the dual port memory, the processor, and the radio, wherein the electrical interlock for each interface of the interfaces supplies the peripheral power from the battery to the interface only while the mechanical interlock of the interface is engaging the respective environmental sensor and the interface is not asleep.

19. The platform of claim 18, wherein the electrical interlock for each interface of the interfaces includes a transistor switch for controlling whether the battery supplies the peripheral power for the interface, wherein:

the transistor switch connects the battery to the interface for supplying the peripheral power while the electrical interlock detects that the mechanical interlock for the interface is engaging the respective environmental sensor and the interface is not asleep, and otherwise the transistor switch disconnects the battery from the interface.

20. A low-power platform for sensing an environment comprising:

a plurality of interfaces for attaching environmental sensors, each of the interfaces including a mechanical interlock for attaching a respective one of the environmental sensors and an electrical interlock for detecting whether the mechanical interlock engages the respective environmental sensor, each of the interfaces for transferring peripheral power and environmental data between the platform and the respective environmental sensor when the mechanical interlock engages the respective environmental sensor;

a multiplexer for combining the environmental data received from the environmental sensors that are attached to the interfaces into a single stream;

a dual port memory for temporarily storing the stream received from the multiplexer;

a processor for intermittently retrieving the stream stored in the dual port memory;

a radio for forwarding of the stream from the processor toward a central system; and a battery for supplying the peripheral power to the environmental sensors that are attached to the interfaces, and for supplying internal power for the interfaces, the multiplexer, the dual port memory, the processor, and the radio, wherein the mechanical interlock for each of the interfaces includes:

an asymmetrical dovetail for receiving a complementary asymmetrical dovetail of the environmental sensors, and a latch providing tactile and audible feedback when the mechanical interlock engages the respective environmental sensor.

* * * * *